United States Patent [19]

DeKoning et al.

[11] Patent Number: 5,790,773
[45] Date of Patent: Aug. 4, 1998

[54] METHOD AND APPARATUS FOR GENERATING SNAPSHOT COPIES FOR DATA BACKUP IN A RAID SUBSYSTEM

[75] Inventors: Rodney A. DeKoning; Donald R. Humlicek, both of Wichita, Kans.

[73] Assignee: Symbios, Inc., Fort Collins, Colo.

[21] Appl. No.: 580,560

[22] Filed: Dec. 29, 1995

[51] Int. Cl.$^6$ ............................................. G06F 11/14
[52] U.S. Cl. .................. 395/182.04; 711/114; 711/162
[58] Field of Search .................. 395/182.04, 182.05, 395/441, 489; 711/114, 162; 364/941.9, 268.3

[56] References Cited

U.S. PATENT DOCUMENTS

| | | | |
|---|---|---|---|
| 5,210,866 | 5/1993 | Milligan et al. | 395/575 |
| 5,212,784 | 5/1993 | Sparks | 395/575 |
| 5,274,799 | 12/1993 | Brant et al. | 395/575 |
| 5,278,838 | 1/1994 | Ng et al. | 395/182.04 |
| 5,390,327 | 2/1995 | Lubbers et al. | 395/182.05 |
| 5,392,244 | 2/1995 | Jacobson et al. | 365/200 |
| 5,403,639 | 4/1995 | Belsan et al. | 395/600 |
| 5,418,925 | 5/1995 | DeMoss et al. | 395/425 |
| 5,522,031 | 5/1996 | Ellis et al. | 395/182.04 |
| 5,533,190 | 7/1996 | Binford et al. | 395/182.04 |
| 5,574,851 | 11/1996 | Rathunde | 395/182.05 |
| 5,574,855 | 11/1996 | Rosich et al. | 395/183.17 |
| 5,596,709 | 1/1997 | Bond et al. | 395/182.05 |
| 5,604,862 | 2/1997 | Midgely et al. | 395/182.04 |
| 5,611,069 | 3/1997 | Matoba | 395/441 |
| 5,634,033 | 5/1997 | Stewart et al. | 395/441 |
| 5,649,152 | 7/1997 | Ohran et al. | 711/114 |
| 5,651,133 | 7/1997 | Burkes et al. | 711/114 |
| 5,657,468 | 8/1997 | Stallmo et al. | 711/114 |
| 5,689,578 | 11/1997 | Stallmo et al. | 711/114 |

OTHER PUBLICATIONS

Network Appliance's FAServer 450; Ralph Barker; UNIX Review; Nov. 1995.

Primary Examiner—Robert W. Beausoliel, Jr.
Assistant Examiner—Scott T. Baderman
Attorney, Agent, or Firm—Daniel N. Fishman; Wayne P. Bailey

[57] ABSTRACT

Methods and apparatus for the rapid generation of a snapshot copy of the data stored in a RAID storage subsystem. In addition to the users configured RAID logical units, the present invention provides for the definition within the RAID controller of a logical RAID level one device having an operational half comprising the users defined logical unit(s) and having a non-operational mirror component. The user access data stored on the RAID subsystem by direct access to the users defined logical units. When a user directs a snapshot copy request to the operational, user defined logical units, the RAID controller responds by temporarily configuring available storage capacity (e.g. spare disk drives) in the RAID subsystem to perform the function of the non-operational mirror component of the logical RAID level one device. Restoring operation of the non-operational mirror component further causes the RAID controller to rebuild the content of the restored mirror component by copying the content of the user's configured device(s) to the temporary replacement mirror component. Following completion of the rebuild operation, the logical RAID level one device is restored to the status of having a non-operational mirror component. The data copied to the temporarily reconfigured available storage capacity is then returned to the user requesting the snapshot data for further processing as a backup.

18 Claims, 3 Drawing Sheets

METHOD AND APPARATUS FOR GENERATING SNAPSHOT COPIES FOR DATA BACKUP IN A RAID SUBSYSTEM

BACKGROUND OF THE INVENTION

1. Field of the Invention

The present invention relates to the control of disk array storage subsystems and in particular to the use of available storage capacity in a disk array storage subsystem for generating snapshot copies of data for backup purposes.

2. Background of the Invention

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled *A Case for Redundant Arrays of Inexpensive Disks (RAID)*, reviews the fundamental concepts of RAID technology.

RAID level zero, also commonly referred to as disk striping, distributes data stored on a storage subsystem across a plurality of disk drives to permit parallel operation of a plurality of disk drives thereby improving the performance of I/O write requests to the storage subsystem. Though RAID level zero functionality improves I/O write operation performance, reliability of the disk array subsystem is decreased as compared to that of a single large disk drive. To improve reliability of disk arrays, other RAID geometries for data storage include generation and storage of redundancy information to permit continued operation of the disk array through certain common failure modes of the disk drives in the disk array.

There are five "levels" of standard RAID geometries which include redundancy information as defined in the Patterson publication. The simplest array, a RAID level 1 system, comprises one or more disks for storing data and an equal number of additional "mirror" disks for storing copies of the information written to the data disks. The remaining RAID levels, identified as RAID levels 2, 3, 4 and 5 systems, segment the data into portions for storage across several data disks. One or more additional disks are utilized to store error check or parity information. The methods of the present invention may be useful in conjunction with any of the standard RAID levels including level 0.

RAID storage subsystems typically utilize a control module that shields the user or host system from the details of managing the redundant array. The controller makes the subsystem appear to the host computer as one (or more), highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

It is a problem in such RAID subsystems to generate a backup copy of the subsystem while the subsystem remains operational. Prior backup methods required that the subsystem be removed from ongoing (online) operations to assure the integrity and consistency of the backup copy. To permit continued, online operations while performing backup operations generates inconsistencies if the data is modified as the backup operation proceeds. Removing the subsystem from continued storage operations eliminates the risk of inconsistencies arising during the subsystem operations. However, backup operations can be time consuming therefore making removal of the subsystem from operations undesirable.

It is evident from the above discussion that a need exists for rapidly generating a snapshot copy of the data stored in a RAID subsystem to reduce the amount of time that a RAID storage subsystem is removed from availability for storage operations.

SUMMARY OF THE INVENTION

The present invention solves the above and other problems, thereby advancing the state of the useful arts, by providing a method and associated apparatus for rapidly generating a snapshot copy of data in a RAID storage subsystem for purposes of host computer directed backup operations. The present invention comprises methods for generation of a RAID level one (mirrored storage) logical unit within the RAID subsystem controller. The RAID level one logical unit is comprised of two components operable to mirror the data of one component to the other component. The first component is the users configured storage (e.g. configured RAID logical unit(s)). The second component of the mirrored RAID level one logical unit is a nonexistent storage component having a nominally non-operational or missing status.

The RAID level one logical unit is referred to herein as a "logical" device in that the attached host computer system(s) need not directly address its logical unit number during normal operation. Rather, the logical RAID level one device "operates" in a degraded mode without mirrored operation (due to its non-operational or missing mirror component). All user storage manipulations are performed directly to the user's configured logical unit(s) or indirectly through the operational component of the RAID level one device. For example, the user performs storage operations to/from an operational RAID level five logical unit which is configured as the operational component of the logical RAID level one device.

When an attached host computer system requests a snapshot copy of the operational logical unit, the RAID controller responds by temporarily reconfiguring spare disk devices (or any available storage capacity) in the RAID subsystem to perform the function of the non-operational or missing mirror component of the RAID level one device. Restoration of the missing RAID level one mirror component device to an operational status by reconfiguring the available storage capacity to temporarily perform the function causes a rebuild operation to be performed on the level one mirrored logical unit by the RAID controller. The rebuild operation copies data from the operational portion of the logical RAID level one device (the user's configured logical unit(s)) to the restored logical RAID level one mirror component. The rebuild operation performed on the reconfigured level one mirror component (also referred to herein as a replacement mirror component) is automatically performed by the standard RAID control functions operable in a RAID level one device.

This copy operation rapidly generates a snapshot of the data content stored on the operational half of the logical RAID level one to the available storage capacity temporarily configured as a mirror device in the RAID level one logical unit. Once the rebuild operation is completed, the logical RAID level one device is again reconfigured to reflect a status having a non-operational mirror component. The snapshot data on the available storage capacity can then be returned to the host computer system which requested the snapshot operation for further processing in performing backup operations.

It is therefore an object of the present invention to provide methods and associated apparatus for rapidly performing snapshot copy operations of the data in a RAID storage subsystem.

It is a further object of the present invention to provide methods and associated apparatus for rapidly copying the data stored in a RAID storage subsystem.

It is still a further object of the present invention to provide methods and associated apparatus for rapidly copying the data stored in a RAID subsystem onto available storage capacity of the RAID subsystem.

It is yet another object of the present invention to provide methods and apparatus for defining a RAID level one device having an operational component comprised of configured storage devices and a non-operational mirror component within a RAID storage subsystem which is restored to full operation using available storage capacity to replace the non-operational mirror component of the RAID level one device to thereby rapidly copy the data from the operational component of the RAID level one device.

The above and other objects, aspects, features, and advantages of the present invention will become apparent from the following description and the attached drawing.

DETAILED DESCRIPTION OF THE INVENTION

Figure 1:
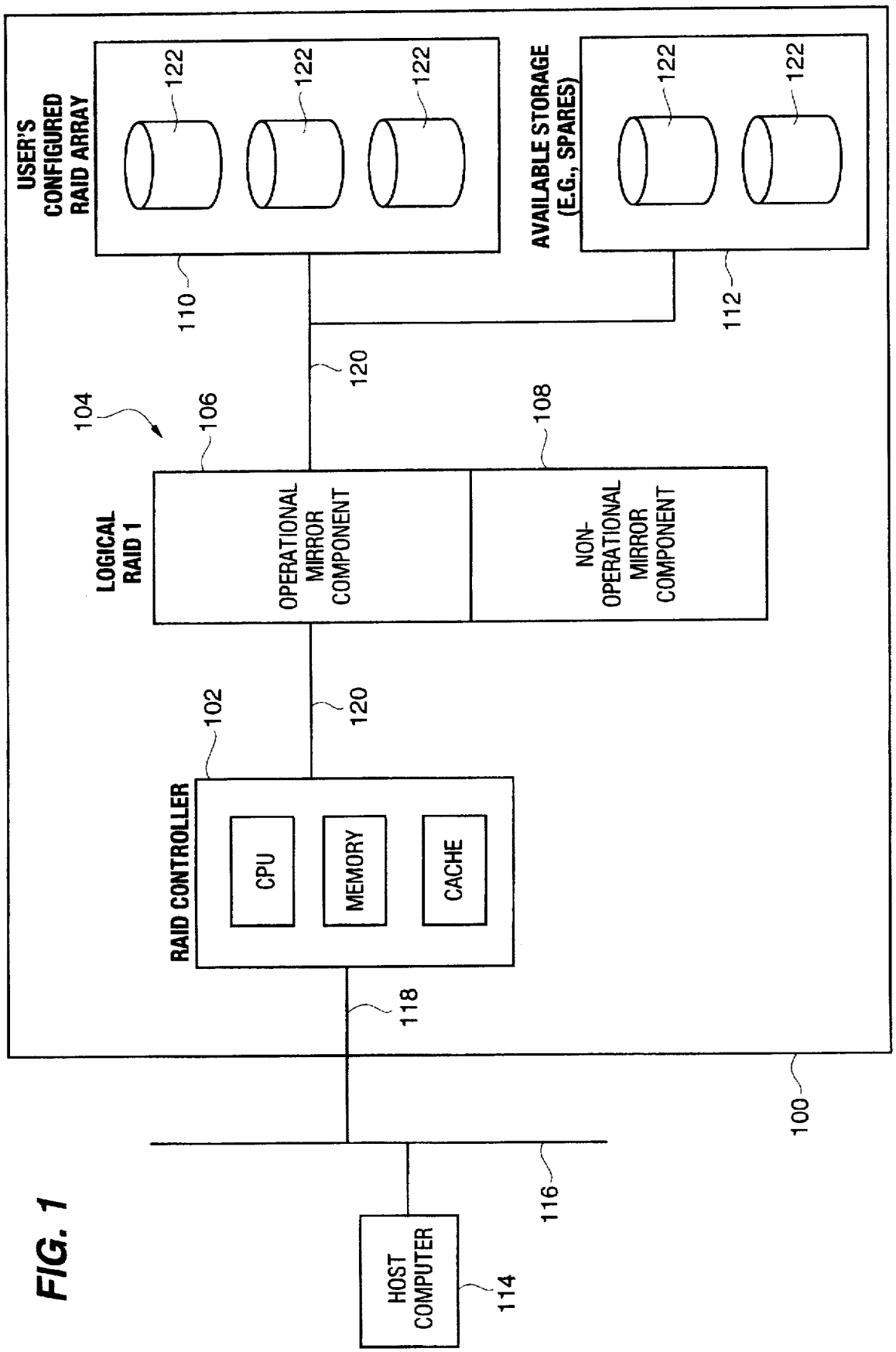
FIG. 1 is a block diagram depicting a typical RAID storage subsystem in which the methods and associated apparatus of the present invention may be advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 depicts a RAID storage subsystem 100 configured in accordance with the methods and structures of the present invention. RAID controller 102 is connected to one (or more) host computer systems 114 via bus 116 and interface 118. As is known to those of ordinary skill in the art, bus 116 may comply with any of several interface standards including: fiber channel, SCSI, Ethernet, etc. Interface 118 adapts RAID controller 102 to communicate with attached host computer(s) 114 via the standard bus 116. SCSI or local area network (LAN) attachments to host computer systems 114 are common for RAID storage subsystems.

RAID controller 102 is connected to disk drives 122 via interface bus 120. Logical RAID level one device 104, users RAID array 110, and available storage capacity 112 are each logical groupings of the array of disk drives 122 used for storage and redundancy control of the information stored in the RAID subsystem 100. Interface bus 120 may be any of several well known interface busses for connection of disk drives, including: SCSI, IDE, EIDE, IPI, Fiber Channel, etc.

User's RAID array 110 is configured by the user of RAID subsystem 100 to perform error and redundancy control over information stored thereon. For example, RAID array 110 may be configured as a RAID level 5 device to minimize the excess storage required for error checking information while improving the overall throughput of the RAID subsystem 100. Users, through host computer system(s) 114, direct data storage and retrieval requests to the logical unit number configured for operation as RAID array 110. As shown in FIG. 1, there is a single user's RAID array 110. One of ordinary skill will readily recognize that several groups of disk drives 122 may be defined for different storage purposes and applications within RAID subsystem 100. The methods and structures of the present invention are applicable regardless of the number of user configured disk array groups and regardless of the RAID level operation defined for each configured array group. Additionally, one of ordinary skill in the art will recognize that the operational component of the logical RAID level one device may be comprised of non-arrayed storage devices as well as arrayed storage devices.

Available storage capacity 112 is shown in FIG. 1 as a group of disk drives 122 (or unused storage space on otherwise allocated disk drives in the RAID subsystem) not configured by the user for operation within a disk array group (such as 110). For example, available storage capacity 112 may be configured as available spare disk drives for replacement of defective disk drives in the user RAID array 110. In the normal operating conditions of the RAID storage subsystem as depicted in FIG. 1, available storage capacity 112 is unused and standing ready for use in replacement of a defective disk drive in user's RAID array 110. This use of available storage capacity 112 (such as for spare disk drives) is well known to those of ordinary skill in the art.

The term "spares" is used herein to represent any available storage capacity within the storage subsystem. Specifically, "spares" refers to spare disk drives commonly added to a RAID storage subsystem as disk drives ready to use as a replacement for a failed disk drive in the RAID subsystem. Such spare disk drives may be either "hot spares" (ready for immediate use by control means which switch the disk into active use) or "cold spares" awaiting manual intervention to replace a defective, active disk drive. Additionally, "spares" refers to excess unused storage capacity in the storage subsystem including unused storage capacity on disk drives configured for data storage in the subsystem. The methods of the present invention are applicable regardless of the physical location of the excess, available storage capacity within the RAID subsystem.

Logical RAID level one device 104 is comprised of two components: an operational component 106 and a nominally missing or absent mirror component 108 (also referred to herein as non-operational mirror component 108). As is known to those of ordinary skill in the art, a RAID level one device is operable to mirror (duplicate) each storage operation performed on an operational component 106 to a mirror component (e.g. non-operational mirror component 108 of FIG. 1). Logical RAID level one device 104 is "logical" in that the user at an attached host computer system 114 does not normally direct I/O requests to the logical RAID level one device 104. Rather, user's direct I/O requests (through attached host computer systems) to the logical unit number of the operational component 106 which represents the user's configured RAID array 110 in the logical RAID level one device 104.

Figure 2:
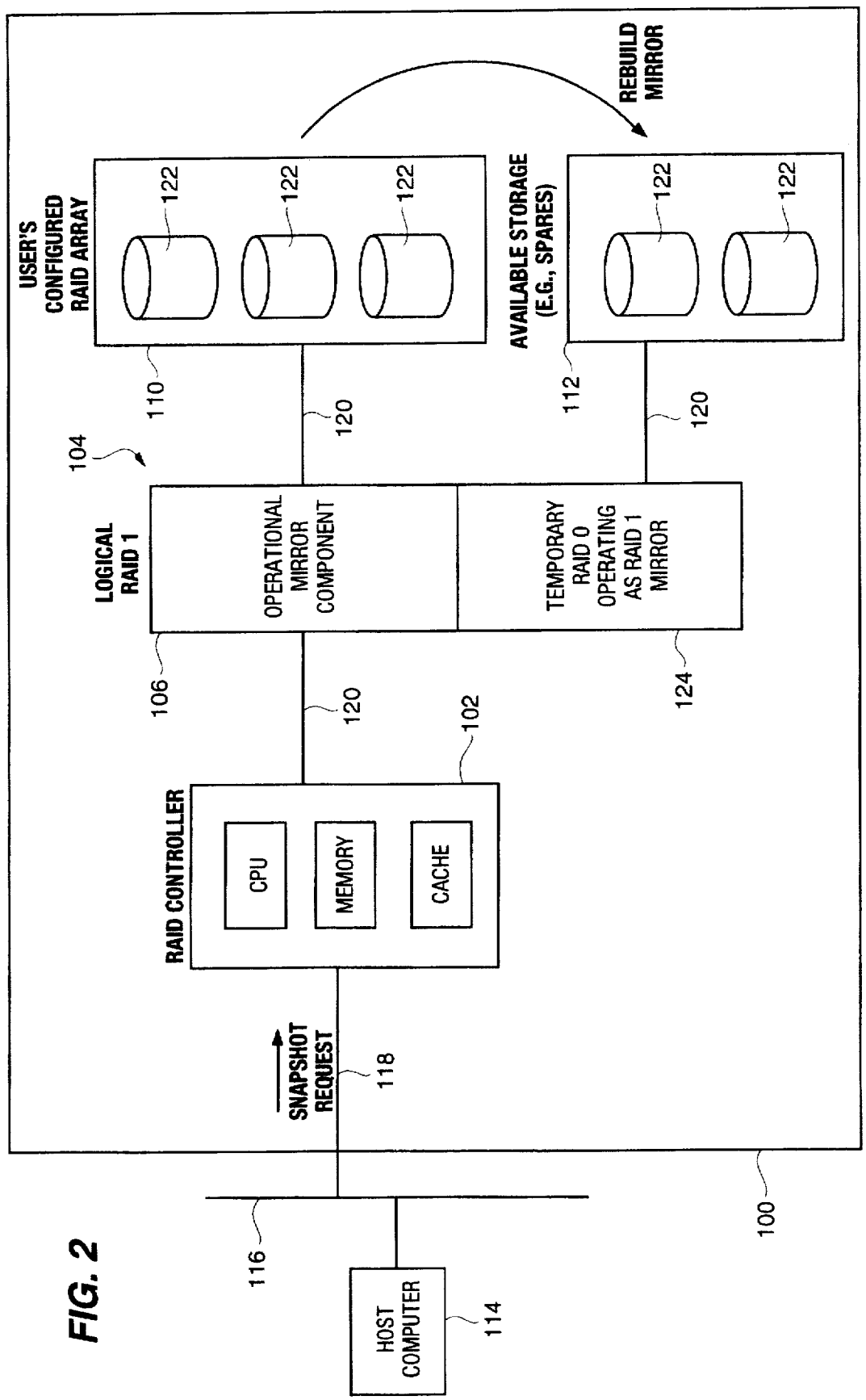
FIG. 2 is a block diagram depicting the RAID storage subsystem of FIG. 1 reconfigured to perform a snapshot copy operation of a selected RAID array.

Referring now to FIG. 2, responsive to a user request for a snapshot copy of a particular configured RAID array 110, RAID controller 102 temporarily reconfigures logical RAID level one device 104 to utilize available storage 112. Specifically, RAID controller 102 receives a snapshot copy request from a user at an attached host computer system 114 over interface 118 and bus 116. In response, RAID controller 102 reconfigures logical RAID level one device 104 so that missing (non-operational) mirror component 108 of FIG. 1 is replaced by a temporary device operating as a replacement mirror component 124. Available storage capacity 112 is used temporarily for purposes of satisfying the user's snapshot copy request.

Implicit in the replacement of a non-operational mirror component 108 of a RAID level one device 104 is the rebuild of the replacement mirror component 124. RAID controller 102 initiates a rebuild operation to copy the data stored on the operational component 106 (physically represented by user's configured RAID array 110) onto the temporary replacement mirror component 124 (physically represented by the reconfigured available storage capacity 112). Upon completion of the rebuild operation by RAID controller 102, a complete copy (snapshot copy) of the data on user's RAID array 110 is now resident on available storage capacity 112. The temporary use of available storage capacity 112 to serve as temporary replacement mirror component 124 is then completed and the status of logical RAID level one device 104 is restored to that depicted in FIG. 1 (e.g. that of a missing or non-operational mirror component 108). The snapshot data copied to available storage capacity 112 may then be returned to attached host computer system(s) 114 for further processing, as for example, to archive the snapshot data for backup purposes.

Temporary replacement mirror component 124 may utilize available storage capacity 112 as a non-RAID device (i.e. as individual disk drives) or in any of the standard RAID configuration levels. Use in a non-RAID mode or in RAID level zero is preferred to eliminate the overhead redundancy storage required of RAID levels 1–5. If sufficient space is available within the available storage capacity 112 to generate the snapshot, then other RAID levels may be configured to serve as temporary replacement mirror component 124 with the added assurance of redundancy and error check information being recorded along with the snapshot data. Non-RAID or RAID level zero operation of replacement mirror component 124 is preferred due to its lower overhead (i.e. no error check or redundancy information recorded). The total storage capacity of temporary replacement mirror component 124 (as physically represented by disk drives 122) need be only as large as the actual data storage capacity of the user's RAID array 110 for which the snapshot copy is requested (i.e. the total data capacity without the overhead of redundancy or error check information). One of ordinary skill in the art will further recognize that the mirrored data rebuilt on replacement mirror component 124 may be compressed by any of several well known data compression techniques to further reduce the storage capacity requirement for configuring the replacement mirror component 124.

If the available storage capacity in the RAID subsystem is insufficient to configure replacement mirror component 124, then an error response may be returned to the host computer system requesting the snapshot copy. One of ordinary skill in the art will recognize other standard error recovery and reporting methods to respond to such an error condition. For example, the snapshot request may be deferred until sufficient storage capacity is again available within the RAID subsystem.

Figure 3:
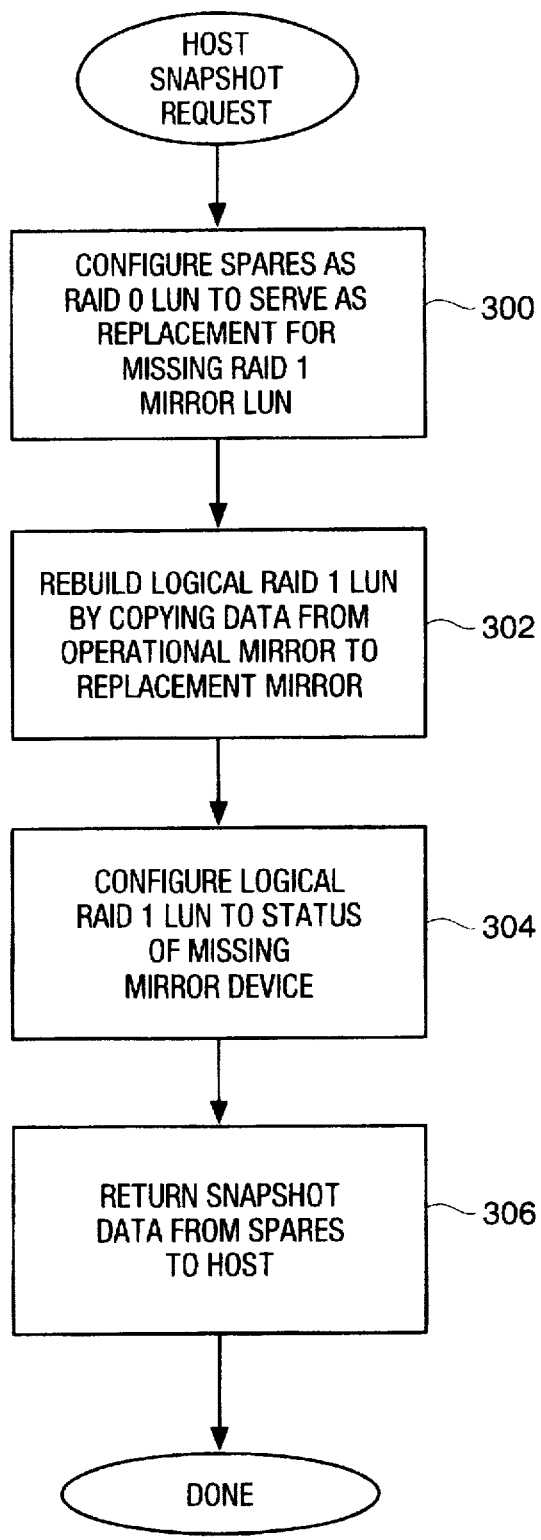
FIG. 3 is a flowchart describing the methods of the present invention operable within a RAID controller to perform a snapshot copy of a selected RAID array.

FIG. 3 is a flowchart describing the operation of the methods of the present invention to rapidly perform a snapshot copy of the data stored in a RAID storage subsystem 100 of FIG. 1. The method described in FIG. 3 is operable within RAID controller 102 of FIG. 1 in response to receipt of a snapshot copy request from an attached host computer system 114. Element 300 is first operable to configure a sufficient number of disk drives 122 of the available storage capacity 112 to serve as a replacement mirror component 124 (of FIG. 2) within logical RAID level one device 104. The number of disk drives which is required is determined by the data capacity of the logical unit number for which the snapshot copy was requested. The data capacity as used herein refers to the data storage capacity of the selected RAID array the total capacity minus any redundancy and error checking information generated. The disk drives are preferably configured within RAID controller 102 as a RAID level zero device so as to minimize the number of disk drives required to contain a complete snapshot copy of the operational component 106 (as physically represented by the user's configured RAID array 110).

Element 302 is then operable within RAID controller 102 to rebuild the data on replacement mirror component 124 (as physically represented by the reconfigured disk drives 122 of available storage space 112). The rebuild operation is well known to those of ordinary skill in the art of RAID level one control methods. The data stored on the operation component 106 of the logical RAID level one device 104 is copied to the replacement mirror component 124 so as to synchronize the data on both of the mirror components (106 and 108/124). Physically, the rebuild is performed by copying the data (exclusive of any redundancy and error checking information) from the user's configured RAID array 110 to the available storage space 112 as temporarily reconfigured to represent a replacement mirror component 124. As noted above, the disk drives used in the temporary replacement mirror component 124 need only be large enough to contain the data storage capacity of the operational component 106 (as physically represented by the user's configured RAID array 110). The user's configured RAID array 10 may be implemented using any of the well known RAID control levels (0–5). Each of the various RAID levels may have a different level of redundancy and error checking information associated with it. The error checking and redundancy information associated therewith is not copied between the operational component 106 and the temporary replacement mirror component 124. In the preferred embodiment, temporary replacement mirror component 124 is physically represented by available storage space 112 configured to operate under control of RAID controller 102 in accordance with the RAID level zero standards. This serves to minimize (to zero) the generation of overhead storage for redundancy and error check information. It may be desirable to utilize error check information in conjunction with the temporary replacement mirror component 124 to enhance the reliability of the snapshot copy. In such circumstances, temporary replacement mirror component 124 may be configured to utilize available storage space 112 in accordance with one of RAID levels 1–5 standards.

Following completion of the rebuild operation by operation of element 302, element 304 is operable to reconfigure logical RAID level one replacement mirror component 124 to restore its previous status—namely that of having a non-operational mirror component 108 and available storage capacity 112 (as shown in FIG. 1). Finally, element 306 is operable to return the snapshot copy of the user's configured RAID array 110 to the requesting host computer system 114. The snapshot copy so generated and returned to the host computer system is then usable for purposes of archival backup or other purposes by the attached host computer system(s). After the snapshot copy is returned to the attached, requesting, host computer system(s), available storage capacity 112 is again usable as disk drives to replace defective disk drives in the user's configured RAID array 110. One of ordinary skill in the art will readily recognize that a priority may be established and implemented within RAID controller 102 to determine the preferred use of a disk drive 122 which contains snapshot copy data not yet returned to the host computer and the need for a disk drive to replace a defective disk in the user's configured RAID array.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for creating a snapshot copy of data in a RAID storage subsystem comprising the steps of:
   configuring a mirrored logical RAID level 1 device within said RAID storage subsystem, said mirrored RAID device having an operational component comprising of a plurality of disk drives configured as a RAID logical unit for storing said data and providing data redundancy and said mirrored RAID device having a non-operational mirror component;
   reconfiguring disk drives in said RAID storage subsystem creating a replacement mirror component to replace said non-operational mirror component; and
   copying said data on said operational component to said replacement mirror component to create a snapshot copy of said data on said operational component.

2. The method of claim 1 further comprising the step of:
   restoring, responsive to said copying step, the status of said logical mirrored RAID device to that of having a non-operational mirror component.

3. The method of claim 1 further comprising the step of:
   returning said data copied on said replacement mirror component to an attached host computer system for further processing.

4. The method of claim 1 wherein said non-operational mirror component is a RAID device.

5. The method of claim 1 further comprising the step of:
   compressing said data stored on said replacement mirror component by operation of said copying step.

6. The method of claim 1 wherein said replacement mirror component is a RAID device.

7. The method of claim 6 further comprising the step of:
   compressing said data stored on said replacement mirror component by operation of said copying step.

8. The method of claim 7 wherein said replacement mirror component is a RAID level zero device.

9. The method of claim 8 further comprising the step of:
   compressing said data stored on said replacement mirror component by operation of said copying step.

10. A RAID controller adapted to create a snapshot copy of data stored in a RAID storage subsystem comprising:
    means for configuring a mirrored logical RAID level 1 device within said RAID storage subsystem, said mirrored RAID device having an operational component comprising of a plurality of disk drives configured as a RAID logical unit for storing said e data and providing data redundancy and said mirrored RAID device having a non-operational mirror component;
    means for reconfiguring disk drives in said RAID storage subsystem creating a replacement mirror component to replace said non-operational mirror component; and
    means for copying said data on said operational component to said replacement mirror component to create a snapshot copy of said data on said operational component.

11. The RAID controller of claim 10 further comprising:
    means for restoring, responsive to said copying means, the status of said logical mirrored RAID device to that of having a non-operational mirror component.

12. The RAID controller of claim 10 further comprising:
    means for returning said data copied on said replacement mirror component to an attached host computer system for further processing.

13. The RAID controller of claim 10 wherein said non-operational mirror component is a RAID device.

14. The RAID controller of claim 10 further comprising:
    means for compressing said data stored on said replacement mirror component by operation of said copying means.

15. The RAID controller of claim 10 wherein said replacement mirror component is a RAID device.

16. The RAID controller of claim 15 further comprising:
    means for compressing said data stored on said replacement mirror component by operation of said copying means.

17. The RAID controller of claim 15 wherein said replacement mirror component is a RAID level zero device.

18. The RAID controller of claim 17 further comprising:
    means for compressing said data stored on said replacement mirror component by operation of said copying means.

* * * * *